United States Patent

[11] 3,588,818

[72] Inventors David B. Congleton Redondo Beach; Sydney Glazer, Los Angeles; Melvin S. Armstrong, Lomita, Calif.

[21] Appl. No. 651,855
[22] Filed July 7, 1967
[45] Patented June 28, 1971
[73] Assignee The National Cash Register Company Dayton, Ohio

[54] CHARACTER RECOGNITION SYSTEM EMPLOYING CONTINUITY DETECTION AND REGISTRATION MEANS
24 Claims, 20 Drawing Figs.

[52] U.S. Cl. 340/146.3
[51] Int. Cl. G06k 9/00
[50] Field of Search 340/146.3

[56] References Cited

UNITED STATES PATENTS

| | | | |
|---|---|---|---|
| 3,196,398 | 7/1965 | Baskin | 340/146.3 |
| 3,234,513 | 2/1966 | Brust | 340/146.3 |
| 3,273,123 | 9/1966 | Lowitz | 340/146.3 |
| 3,289,162 | 11/1966 | Jurk et al. | 340/146.3 |
| 2,932,006 | 4/1960 | Glauberman | 340/146.3 |
| 3,444,380 | 5/1969 | Webb | 340/146.3 |

*Primary Examiner*—Thomas A. Robinson
*Attorneys*—Louis A. Kline and Joseph R. Dwyer

ABSTRACT: A character recognition system which detects and registers a character based on a measure of the continuity or connectivity of character portions during the scanning of a character. Each character is optically scanned, converted into electrical form, and then serially entered into an electronic flip-flop matrix. A particular group of matrix flip-flops are chosen to serve as a "window" and these flip-flops operate in conjunction with respective logical circuits for determining character continuity for each portion of a character as it progresses through the matrix. Varying printing contrasts are automatically handled by providing for appropriate modification of the logical circuits which determine continuity in response to the existing printing contrast.

INVENTORS
DAVID B. CONGLETON
SYDNEY GLASER
MELVIN S. ARMSTRONG

BY Louis A Kline
John J. Matlago
Nathan Cass
THEIR ATTORNEYS

INVENTORS
DAVID B. CONGLETON
SYDNEY GLASER
MELVIN S. ARMSTRONG

BY Louis A. Kline
John J. Matlago
Nathan Cass
THEIR ATTORNEYS

1/2 of First Column Scan

3/4 of Sixth Column Scan

1/4 of Eleventh Column Scan

1/2 of Thirteenth Column Scan

End of Thirteenth Column Scan

INVENTORS
DAVID B. CONGLETON
SYDNEY GLASER
MELVIN S. ARMSTRONG

BY Louis A Kline
John J. Matlago
Nathan Cass
THEIR ATTORNEYS

Patented June 28, 1971 3,588,818

8 Sheets-Sheet 4

INVENTORS
DAVID B. CONGLETON
SYDNEY GLASER
MELVIN S. ARMSTRONG

BY Louis A Kline
John T. Matlago
Nathan Cass
THEIR ATTORNEYS

INVENTORS
DAVID B. CONGLETON
SYDNEY GLASER
MELVIN S. ARMSTRONG

BY Louis A. Kline
John T. Matlago
Nathan Cass
THEIR ATTORNEYS

NOISE BIT PATTERN

= Matrix Flip-Flop "on"

= Matrix Flip-Flop "on" And Respective FIG. 10 Block Activated

CHARACTER BIT PATTERN

= Matrix Flip-Flip "on"

= Matrix Flip-Flop "on" And Respective FIG. 10 Block Activated

INVENTORS
DAVID B. CONGLETON
SYDNEY GLASER
MELVIN S. ARMSTRONG

BY Louis A. Kline
John J. Matlago
Nathan Cass
THEIR ATTORNEYS

INVENTORS
DAVID B. CONGLETON
SYDNEY GLASER
MELVIN S. ARMSTRONG

Louis A Kline
BY John T. Mathago
Nathan Sass
THEIR ATTORNEYS

INVENTORS
DAVID B. CONGLETON
SYDNEY GLASER
MELVIN S. ARMSTRONG

BY Louis A Kline
John T. Matlago
Nathan Cass
THEIR ATTORNEYS

CHARACTER RECOGNITION SYSTEM EMPLOYING CONTINUITY DETECTION AND REGISTRATION MEANS

This invention relates generally to character readers, and more particularly to a character reader having improved character detection and registration means.

With the ever-expanding use of computers and other automatic equipment in business and industry, there has been an increased effort to provide improved character readers capable of automatically reading printed characters and the like so that the data represented thereby can be directly applied to a computer or other utilization device without the need of first manually converting the data into a special form suitable for the computer. Various approaches to character readers are described in the National Bureau of Standards Technical Note 112, dated May 1961, and entitled "Automatic Character Recognition—A-State-of-the-Art Report."

The major objects of the present invention are to provide improvements in automatic character recognition systems particularly with regard to means and methods for detecting and registering characters. These objects are achieved by the employment of a novel continuity measurement technique which has been discovered to provide a remarkably high discrimination between character portions and noise, such as caused, for example, by printing and/or paper defects, ink splatters, etc.

The specific nature of the invention as well as other objects, advantages and uses thereof will become apparent from the following detailed description of an exemplary embodiment thereof illustrated in the accompanying drawings in which.

Figures 1, 2:
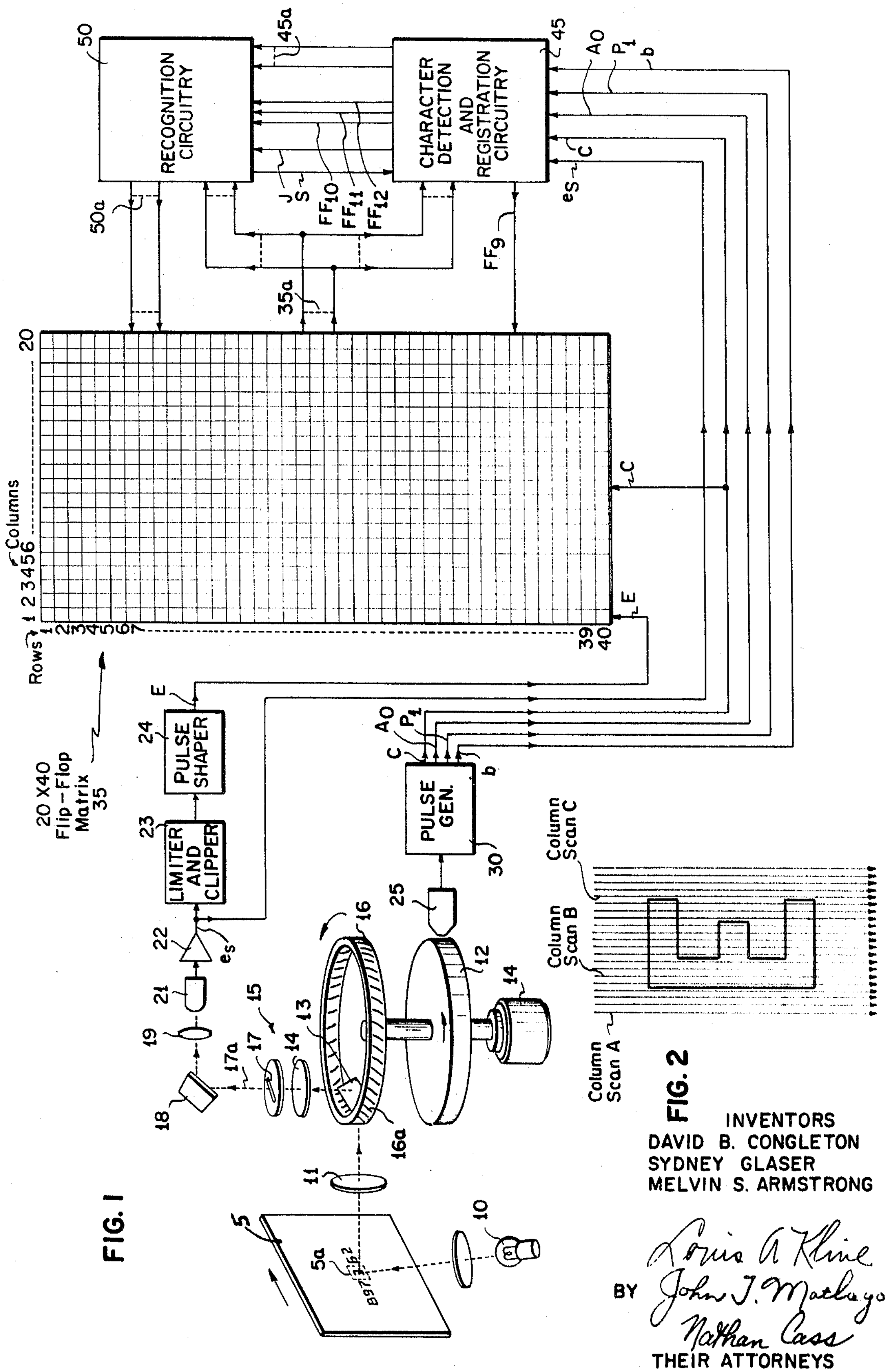
FIG. 1 is a schematic and block diagram of an exemplary embodiment of a character reader in accordance with the invention.
FIG. 2 is a schematic diagram illustrating how a character is scanned by the embodiment of FIG. 1 as the character progresses through the scanning field.
Figure 10:
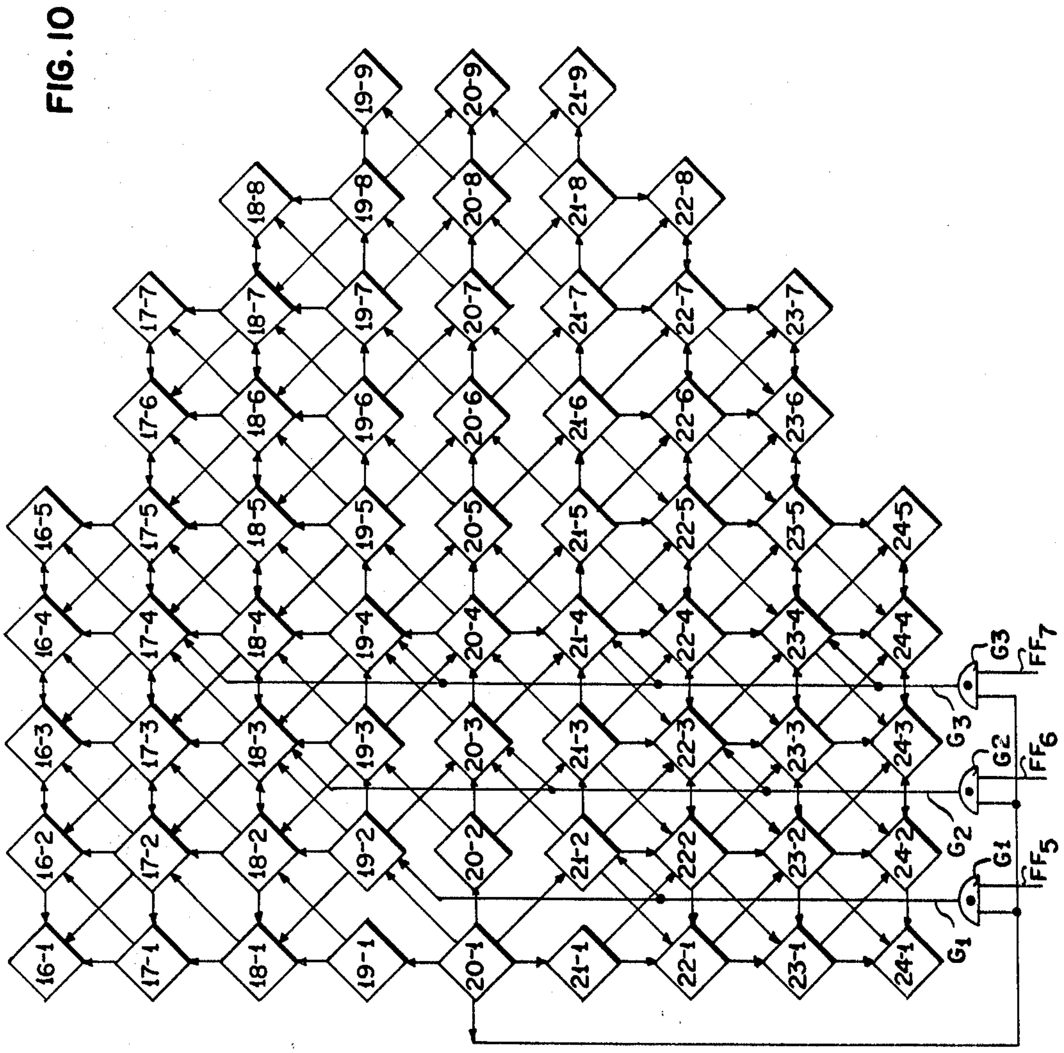
Figure 11:
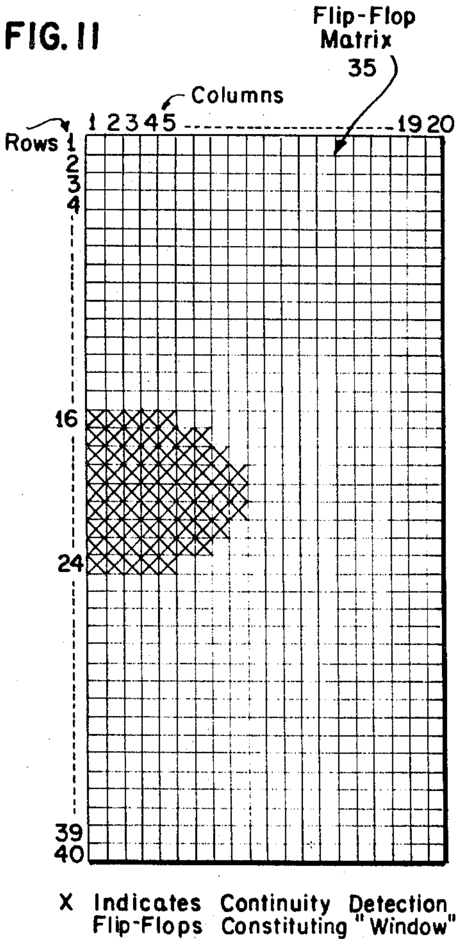
Figure 14:
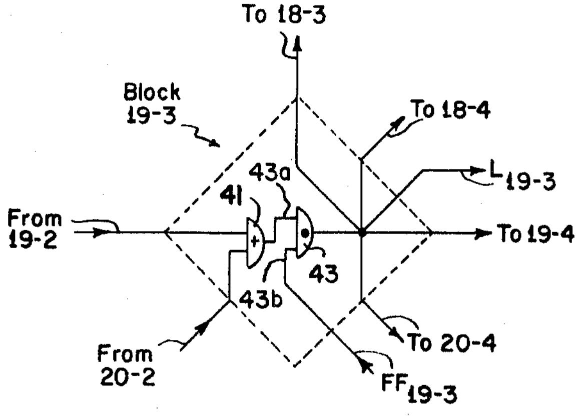
Figure 15:
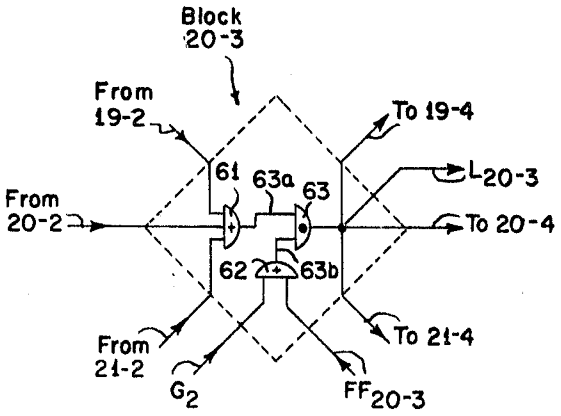
Figure 16:
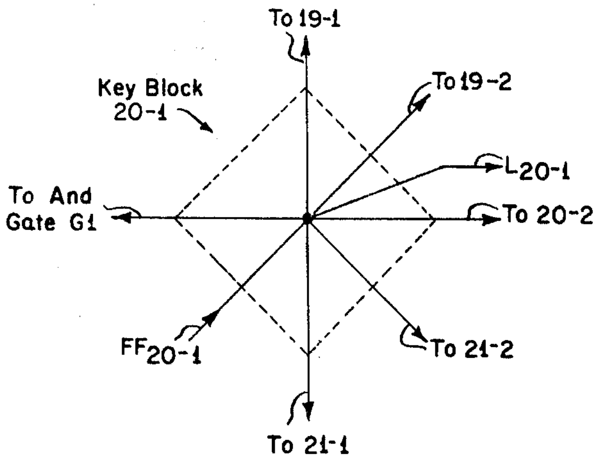
Figures 12, 13:
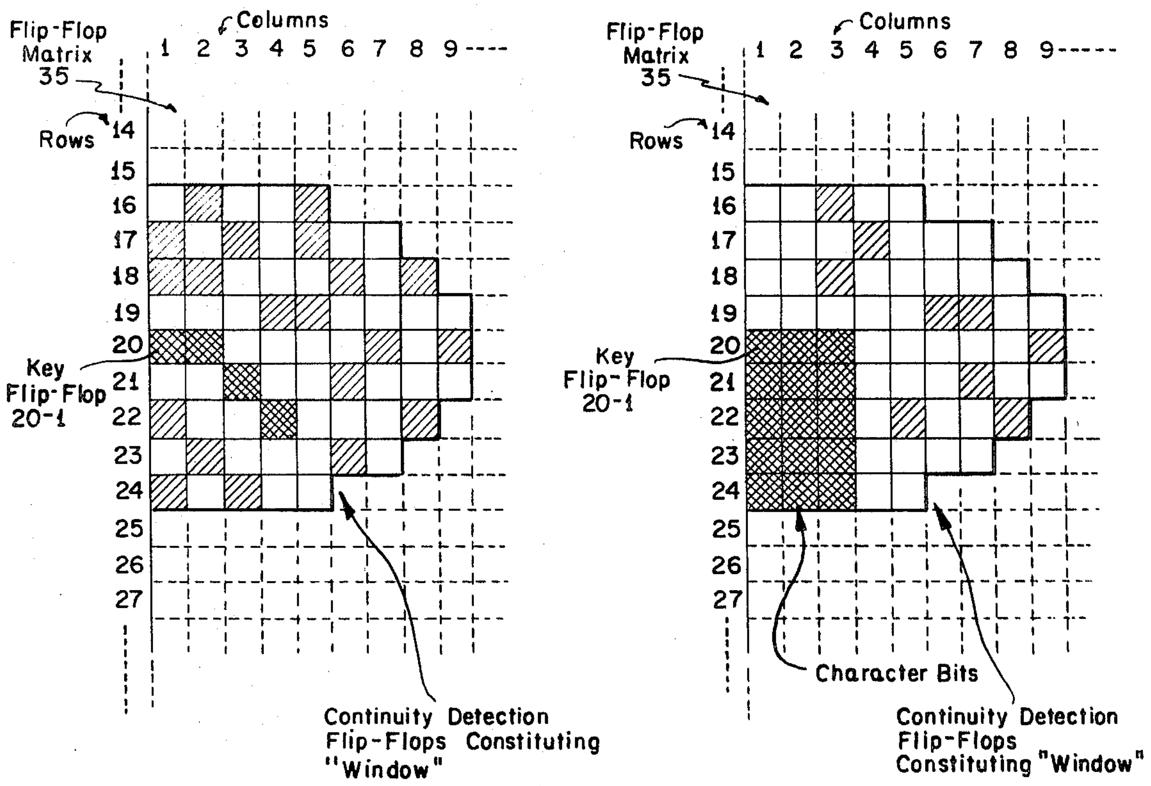

FIGS. 5—9 are schematic diagrams illustrating how a character is entered into the matrix of FIG. 1 as the character progresses through the scanning field;

FIG. 10 is an electrical block diagram illustrating the interconnection of the logical circuits which are used in detecting character continuity;

FIG. 11 is a schematic diagram illustrating the location of the continuity detection matrix flip-flop forming the "window" which, in cooperation with respective logical circuits in FIG. 10, are used to detect continuity of each portion of a character as it progresses through the matrix;

FIGS. 12 and 13 are schematic diagrams respectively, illustrating a noise bit pattern and a character bit pattern in the continuity detection matrix flip-flops constituting the "window";

FIGS. 14—16 are electrical circuit diagrams illustrating the detailed construction and operation of three of the blocks in FIG. 10; and FIGS. 17—20 are electrical block diagrams illustrating details of the character detection and registration circuitry of FIG. 1.

Like numerals designate like elements throughout the FIGS. of the drawings.

By way of example, the character recognition system to be described herein may be of the electronic contour scanning type disclosed in U.S. Pat. No. 3,213,423. It is to be understood, however, that the present invention is not limited to such use, since the invention is capable of incorporation in various other types of systems and applications, as will become evident from the description provided herein.

With reference to FIG. 1, which is an overall diagram of the embodiment to be described herein, a sheet 5 containing characters to be read is suitably moved, preferably at a continuous rate, so as to cause each character which is to be read to in turn pass through a scanning field 5*a*. Bar-helix scanning means, generally indicated by numeral 15 in FIG. 1, serve to provide a vertical scan of field 5*a* as illustrated, for example, in FIG. 2, resulting in a light beam containing the scanning information being applied to a photodetector 21, whose output is applied to an amplifier 22 to produce an electrical output signal $e_s$ representing the black-white level observed in field 5*a* at each position of the vertical scan. Signal $e_s$ is applied in appropriate form to a flip-flop matrix 35 and to character detection and registration character circuitry 45 in order to detect and register each character for identification by recognition circuitry 50. Since the features and advantages of the present invention can be illustrated as applied to the problem of detecting and registering a character using character detection and registration circuitry 45, recognition circuitry 50 and its cooperation with matrix 35 and character detection and registration circuitry 45 will not be described in detail, such being typically disclosed in U.S. Pat. No. 3,213,423.

With the above general description as background, FIG. 1 will now be considered in more detail. A light source 10 illuminates scanning field 5*a* on sheet 5 and a suitable optical system 11 forms an image of the scanning field 5*a* on the periphery of a drum 16 of the bar-helix scanning means 15, the drum 16 being continuously rotated by a suitable motor 14. Helical slots 16*a* are provided in the drum periphery cooperating with a mirror 13 and a suitable optical system 14 so that light passing through each helical slot 16*a* as it traverses the image of the scanning field on the drum periphery is imaged onto a bar 17. It will be understood that, by suitable arrangement of helical slots 16*a* and bar 17 in a well-known manner, and by proper choice of the speed of rotation of drum 16 and the movement of sheet 5, the optical output 17*a* from bar 17 can be made to correspond to the vertical scan illustrated in FIG. 2.

Figure 3:
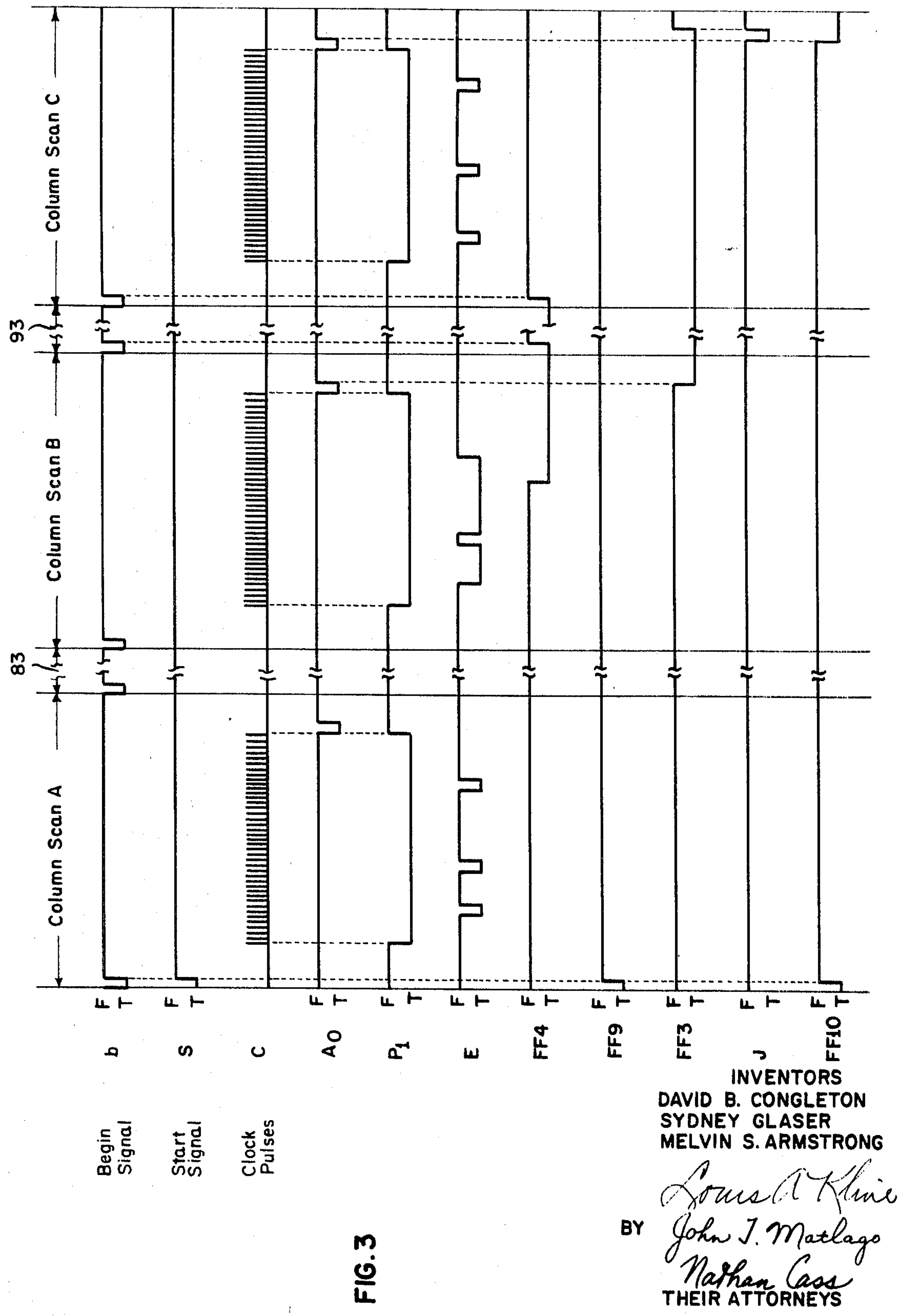
FIG. 3 is a timing diagram illustrating the timing relationships of pertinent signals during exemplary column scans of a character.

The optical output 17*a* from bar 17 in FIG. 1 is converted by photodetector 21 and amplifier 22 into a signal $e_s$ representing the instantaneous black-white level obtained as the scanning field 5*a* is scanned in the manner illustrated in FIG. 2. Signal $e_s$ is applied to registration circuitry 45 for purposes which will be considered later on herein, and is also applied, via a limiter and clipper 23 and a pulse shaper 24, to flip-flop matrix 35. Limiter and clipper 23 and pulse shaper 24 form signal $e_s$ into a binary signal E which, as illustrated in the respective graph in FIG. 3, is a true logical level whenever signal $e_s$ indicates that black is being scanned in scanning field 5*a*, and is at a false logical level whenever white is being scanned in scanning field 5*a*.

Synchronizing signals for use by flip-flop matrix 35 and character detection and registration circuitry 45 in FIG. 1 are obtained from a second drum 12 rotating on the same shaft as drum 16, and having a magnetic film on its periphery containing appropriately located recorded signals. A magnetic head 25 detects these recorded signals and applies them to a pulse generator 30 to produce the signals C, $A_o$, $P_1$ and *b* during each column scan having the characteristics illustrated in the respective graphs in FIG. 3.

Figure 4:
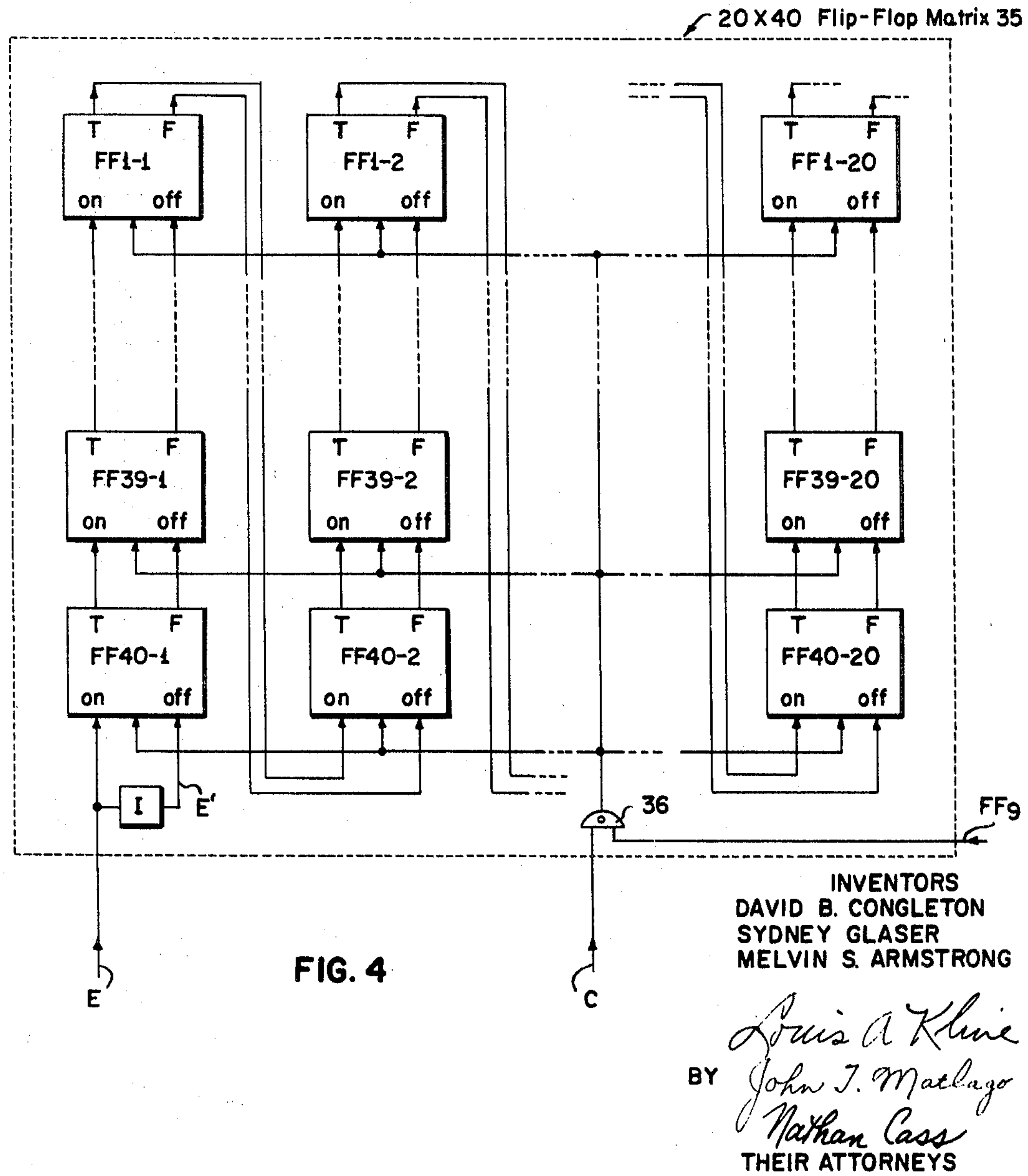
FIG. 4 is an electrical block and circuit diagram illustrating the construction and arrangement of the flip-flop matrix of FIG. 1.

Referring now to FIG. 4 which illustrates details of the flip-flop matrix 35 of FIG. 1, it will be understood that matrix 35 may typically contain 800 flip-flops FF1–1 to FF40–20 in a row-column arrangement of 40 rows and 20 columns. The first number following each flip-flop indicates the row in which it is located, and the second number indicates the column. As illustrated in FIG. 4, except for the flip-flops in the last or fortieth row, the "on" and "off" inputs of each flip-flop are respectively coupled to the binary true and false outputs T and F of the immediately lower flip-flop in the same column; in the fortieth row, flip-flop FF40–1 has its "on" and "off" inputs respectively coupled to signal E and its inverse E' (obtained via inverter I), and each of the other fortieth row flip-flops FF40–20 has its "on" and "off" inputs respectively coupled to the true and false outputs T and F of the top or first row flip-flop in the preceding column. Operation of the matrix flip-flops in FIG. 4 occurs in response to clock pulses C applied thereto via and AND gate 36, which is enabled by signal $FF_9$ during registration operations. As illustrated in the respective graph in FIG. 3, 40 clock pulses are produced during each column scan, one for each row of flip-flops in matrix 35. It will be understood that, in order to prevent retriggering as could occur if a new state of a flip-flop became effective during the same clock pulse as produced the new state, each flip-flop in FIG. 4, as well as other flip-flops to be illustrated later on herein, may be considered to be of a well-known type which switches in response to the trailing edge of a true pulse applied thereto.

Figure 5:
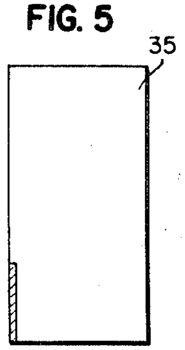
Figure 6:
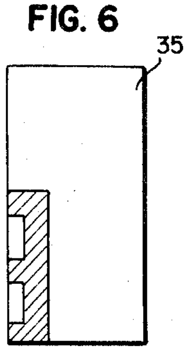
Figure 7:
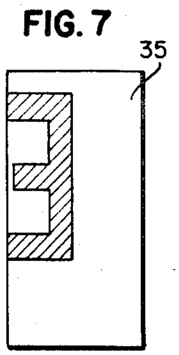
Figure 8:
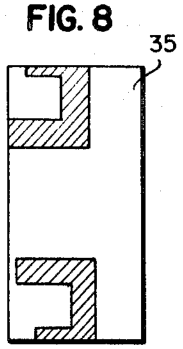
Figure 9:
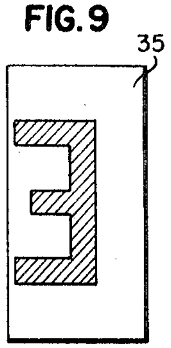

The operation of matrix 35 in FIG. 4 is, therefore, such that, at each clock pulse C occurring when $FF_9$ is true, the state of signal E is applied to input flip-flop 40–1 via AND gate 36, a true or black bit being applied to flip-flop 40–1 if black is being scanned during the occurrence of the clock pulse, and a white or false bit being applied to flip-flop 40–1 if white is being scanned during the occurrence of the clock pulse. From input flip-flop 40–1, each bit of input data is then shifted upward each clock pulse and, when the top flip-flop of a column is reached, the shifting of data then proceeds to the bottom flip-flop of the next column, and so on for every other column. In effect, therefore, as a character is scanned in the manner illustrated in FIG. 2, the character will serially enter the matrix in a spiral manner, as illustrated, for example, for the numeral 3 in FIGS. 5—9, which show the arrangement of data in matrix 35 for four different instants in the scanning operation. Crosshatched portions in FIGS. 5—9 indicate that the respective matrix flip-flops corresponding thereto are "on" at the time indicated. FIG. 5 shows the arrangement of data after completion of one-half of the first column scan which intercepts the character, FIG. 6 shows the arrangement after three-fourths of the sixth column scan, FIG. 7 shows the arrangement after one-fourth of the eleventh column scan, FIG. 8 shows the arrangement after one-half of the thirteenth column scan, and FIG. 9 shows the arrangement at the end of the thirteenth column scan.

Having described how a character enters the flip-flop matrix 35, the manner in which the registration circuitry 45 of FIG. 1 provides for the detection and registration of a character in accordance with the invention will now be considered.

To aid in better understanding the present invention, the basic principle of operation employed in achieving detection and registration will first be described from an overall viewpoint. The basic principle of operation of the present invention involves the use of a continuity detection technique which insures knowledge of the presence of a character (as distinguished from noise, such as caused, for example, by ink splatter, paper defects, etc.) by detecting when a sufficient continuity or "connectivity" exists in the scanning field with respect to a reference point. A most important advantage of such an approach is that it provides a much greater discrimination between noise black portions and character black portions, than was heretofore possible, even though the noise black portions may have the same or a greater percentage of black in a given area than a character portion. The reason that this advantageous discrimination is possible is because the nature of most noise producing defects is such that they have a low order of continuity or connectivity, as compared to a character portion, and this distinction is used to advantage by the present invention in providing a continuity detection technique which achieves a high discrimination between noise and character portions. For example, it will be understood that ink splatter may produce a considerable amount of black in a given area, but usually with relatively little continuity or connectivity therebetween, as compared to a character portion.

With the above general description of the basic continuity detection principle of the present invention in view, reference is now directed to FIG. 10 which illustrates preferred exemplary means provided in the character detection and recognition circuitry 45 of FIG. 1 for obtaining continuity detection in accordance with the invention. Each diamond-shaped block in FIG. 10 is a logical circuit corresponding to a particular respective flip-flop in matrix 35 (FIGS. 1 and 4); the first number of each diamond-shaped block is the row of the corresponding flip-flop and the second number is the column. It will be evident that the diamond-shaped logical circuits in FIG. 10 are provided for only a particular group of the flip-flops of matrix 35, as illustrated in FIG. 11. An *x* in FIG. 11 indicates a flip-flop in matrix 35 for which a corresponding diamond-shaped logical circuit is provided in FIG. 11, and such flip-flops will be referred to herein as continuity detection flip-flops. As will shortly become evident, these continuity detection flip-flops of FIG. 11 may be considered to constitute a "window" which is used to provide a measure of the continuity or connectivity of black portions entering matrix 35.

For the sake of economy and simplicity, it is highly desirable that the "window" be as small as possible, that is, the number of continuity detection flip-flops in FIG. 11 should be kept to a minimum so as to reduce the number of required logical blocks in FIG. 10. Accordingly, the logical blocks of FIG. 10 are chosen so that the number and location of their corresponding continuity detection flip-flops permit a large enough portion of matrix 35 to be examined consistent with the continuity measuring capability of the respective logical circuits of FIG. 10, so as to achieve the desired discrimination between noise black portions and character black portions. The manner in which the specific continuity detection means of the present invention permit a relatively small "window" to be used will become evident in the course of the detailed description thereof which will now be presented.

Referring to FIG. 10, each diamond-shaped block (except for key block 20–1) performs the following logical operation: if the respective flip-flop corresponding to the block is "on" (indicating the presence of a black character bit at the respective matrix position), and if, in addition, at least one other output applied thereto from another block in FIG. 10 is at a true logical level, then the block will be activated to cause all outputs therefrom to be at a true logical level. As for key block 20–1, no outputs from any other blocks in FIG. 10 are applied thereto. Block 20–1 is accordingly caused to be activated whenever its respective matrix flip-flop is "on." regardless of the activation of any other blocks. It will thus be understood that key block 20–1 serves as the starting point from which propagation to the right (as viewed in FIG. 10) is able to occur; once key block 20–1 is activated, the greater the connectivity or continuity of the black portions contained in the window relative to the key 20–1 position, the more blocks in FIG. 10 which will be activated, and the more the activation of blocks will propagate to the right, the resulting total number of activated blocks being a measure of the continuity of the black bits in the window with respect to the key bit position 20–1. Since input data enters matrix 35 serially, each character bit will pass through all matrix flip-flops. As a result, the continuity with respect to every black bit entering the matrix can be measured when it arrives at the key matrix position 20–1. In order to prevent overlapping operation, the design of FIG. 10 should be such that propagation initiated during a clock pulse is completed before the occurrence of the next clock pulse.

Examples of the above described operation of FIG. 10 will now be presented for the two situations illustrated in FIGS. 12 and 13. FIG. 12 illustrates the presence of an exemplary noise black pattern in the continuity detection flip-flops of matrix 35 constituting the window, while FIG. 13 illustrates an exemplary black character portion in the window, the crosshatching indicating which matrix flip-flops are "on" as a result of a black bit being present in their respective matrix positions. Double crosshatching is used in FIGS. 12 and 13 to indicate that the respective block in FIG. 10 is activated in addition to the respective matrix flip-flop being "on." For the purposes of the examples of FIGS. 12 and 13, the operative effect of AND gates G1, G2 and G3 at the bottom of FIG. 10 may be ignored, the purpose thereof being to handle character breaks, as will be described hereinafter.

Considering the noise black pattern of FIG. 12 first, it will be understood that, since a black bit is present in the key matrix position 20–1, matrix flip-flop will be "on" and key block 20–1 in FIG. 10 will be activated, causing its outputs to be at a true logical level. As pointed out previously, if key block 20–1 is not activated, no other block in FIG. 10 can be activated no matter how many black bits are present in the window. Since key block 20–1 is activated in the example of FIG. 12 (as indicated by the double crosshatching), and its outputs are applied to blocks 19–1, 19–2, 20–2, 21–2 and 21–1, each of these blocks will in turn be activated only if its respective matrix flip-flop is "on" as a result of a black bit being present in the matrix position corresponding thereto. Of these, only matrix flip-flop 20–2 is "on," so only it will be activated to in turn provide true outputs to blocks 19–3, 20–3 and 21–3. Since, of these, only the respective matrix flip-flop of block 21–3 is "on," only it will be activated to in turn provide true outputs to blocks 20–4, 21–4, 22–4, 22–3, and 22–2, of which only block 22–4 will be activated because only its respective matrix flip-flop is "on." Besides the above four blocks 20–1, 20–2, 21–3 and 22–4, no other blocks in FIG. 10 will be activated because of the lack of continuity of the FIG. 12 black pattern. Accordingly, the continuity of the noise bit pattern of FIG. 12 with respect to the key bit at the instant illustrated may be considered to have a value of 4 as a result of 4 blocks in FIG. 10 being activated.

Next to be considered is the example of FIG. 13 which illustrates an exemplary character black bit pattern contained in the window along with some scattered noise black bits. It will be understood from the previous description of FIG. 12 that, since key matrix flip-flop 20–1 is "on," key block 20–1 is activated, permitting propagation to occur to cause activation of the fifteen blocks 20–1, 20–2, 20–3, 21–1, 21–2, 21–3, 22–1, 22–2, 22–3, 23–1, 23–2, 23–3, 24–1, 24–2, and 24–3 in FIG. 10, as indicated by the double crosshatching in FIG. 13; it will be evident that each such activated block has its respective matrix flip-flop "on" and at least one true output applied thereto. The continuity of the character bit pattern of FIG. 13 with respect to the key bit position 20–1 at the instant of scanning illustrated may thus be considered to have a value of 15, since 15 of the blocks in FIG. 10 were caused to be activated thereby. It is significant to note that although the noise bit pattern of FIG. 12 and the character bit pattern of FIG. 13 have the same percentage of black area in the window, the character bit pattern of FIG. 13 provides a continuity value of 15, as compared to a continuity value of 4 provided by the noise pattern of FIG. 12. Typically, for printing of normal contract, a continuity value of 9 or more might be chosen as the acceptable minimum required to consider that a character portion is present in the scanning field.

Having described how the character detection and registration circuitry 45 of FIG. 1, using the logical circuit arrangement of FIG. 10 in cooperation with the continuity detection flip-flops (FIG. 11) of matrix 35, is able to provide a continuity measurement with respect to each black bit entering the matrix, specific means for accomplishing same will now be described. As an aid in better understanding this description, it will be helpful to note that the flip-flop notation used herein is such that a flip-flop output is designated by the same number as its respective flip-flop, but with the number provided as a subscript to the flip-flop designation FF, instead of adjacent thereto, a true flip-flop output being unprimed while a false flip-flop output is primed. For example, the true and false outputs of flip-flop $FF_1$ are respectively designated $FF_1$ and $FF_1'$. When a flip-flop is "on" the true and false outputs thereof will be respectively at true and false logical levels, and vice versa, when the flip-flop is "off." It will also be remembered that each flip-flop illustrated herein may be considered to be of a well known type which switches in response to the trailing edge of a true signal applied to its "on" or "off" input, thereby preventing the new state of a flip-flop from prematurely affecting logical operations.

Referring now to FIG. 14, illustrated therein is exemplary logical circuitry for a typical diamond-shaped block of FIG. 10. It will be evident that OR gate 41 operates to apply a true logical level signal to one input 43*a* of the two inputs 43*a* and 43*b* of AND gate 43 whenever one or more of the outputs applied to OR gate 41 from other blocks (such as from block 19–2) is at a true logical level. The other input 43*b* to AND gate 43 of block 19–3 (not shown in FIG. 10 for the sake of clarity) is connected to the true output FF 19–3 of its respective matrix flip-flop FF19–3, the true output FF19–3 providing a true logical level signal when flip-flop FF19–3 is "on." The logical circuitry of FIG. 14 will thus provide the desired logical operation for a block in FIG. 10, since the only time that the two inputs to AND gate 43 will be true to cause a true logical level to be provided on each of the outputs of AND gate 43 will be when at least one block output applied to OR gate 41 is true and, in addition, the respective matrix flip-flop is "on." It will be noted that the output of block 19–3, designated $L_{19-3}$ in FIG. 14, is not shown in FIG. 10, nor is it shown for any of the other blocks in FIG. 10. This is done in order to provide greater clarity for FIG. 10; however, it is to be understood that such an output is provided for each block in FIG. 10, as illustrated in FIGS. 14—16, the true or false condition of which serves to indicate whether or not its respective block is activated.

Referring next to FIG. 15, illustrated therein is a typical diamond-shaped block 20–3 of FIG. 10 of the type which has applied thereto an output from one of the AND gates G1, G2 and G3. The difference between such a block and that illustrated in FIG. 14 is in the provision of an additional OR gate 62 to which is applied the true output of the respective matrix flip-flop (in this case, the true output FF20–3 from matrix flip-flop FF20–3) along with the output of one of the AND gates G1, G2 and G3 in FIG. 10, (in this case the output $G_2$ from AND gate G2). As a result, a block such as illustrated in FIG. 15 will have input 636 to AND gate 63 at a true logical level either when its respective flip-flop is "on," or when the AND gate output applied thereto is true. The purpose of this alternative is to provide for the automatic handling of character breaks, as will be explained hereinafter.

With reference to FIG. 16 which illustrates details of the key block 20–1 in FIG. 10, it will be evident that its logical circuitry is much simpler than that of other blocks in FIG. 10, since key block 20–1 receives no outputs from other blocks and is activated merely whenever its respective matrix flip-flop 20–1 is "on."

Figure 17:
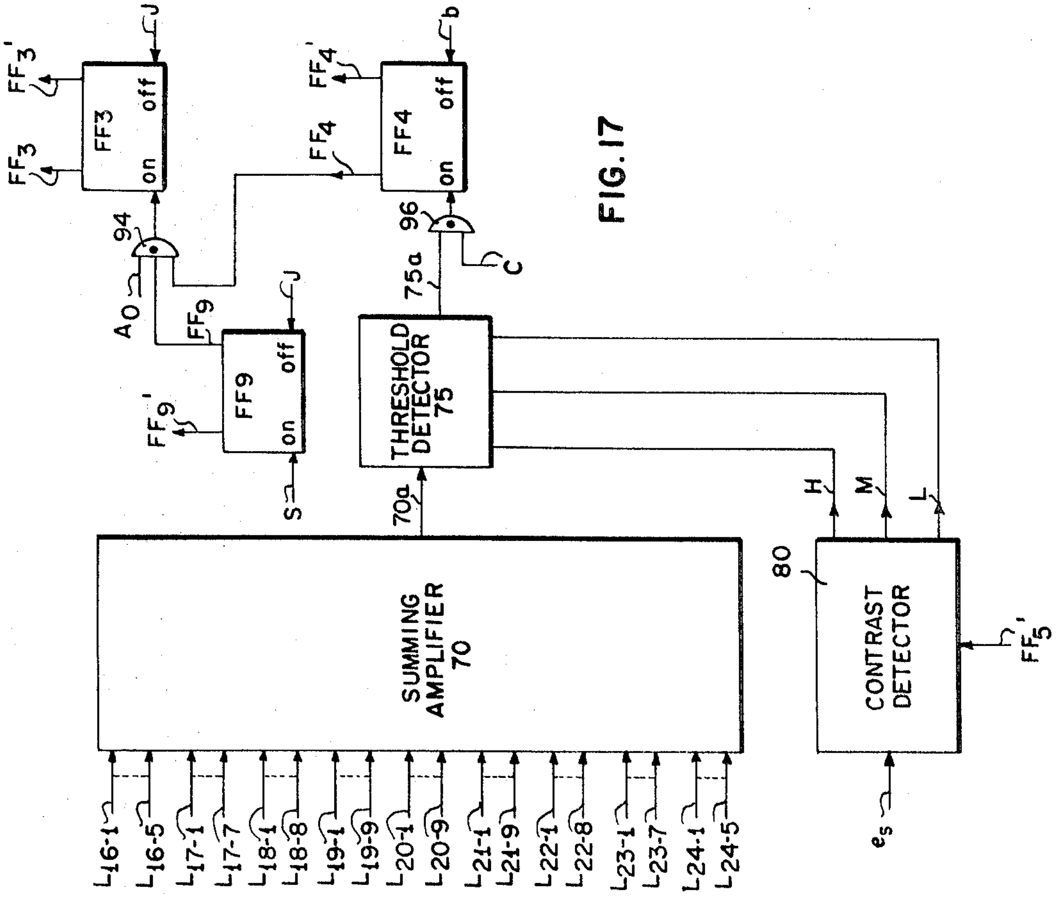

Turning now to a consideration of FIG. 17, the specific manner in which the character detection and registration circuitry 45 of FIG. 1 makes use of the activation of the blocks in FIG. 10 during a scanning operation for detecting and registering a character will now be described. As shown in FIG. 17, the block outputs $L_{16-1}$ to $L_{24-5}$ (provided for all the blocks of FIG. 10, as illustrated for blocks 19–3, 20–3 and 20–1 in FIGS. 14—16) are applied to a summing amplifier 70 which operates to provide an output signal 70*a* whose magnitude is proportional to the number of activated blocks in FIG. 10, as represented by the number of true L outputs applied thereto. Summing amplifier output 70*a* is applied to a threshold detector 75 which provides a true output 75*a* whenever the summing amplifier output 70*a* is greater than a predetermined threshold. In order to accommodate printing contrast variations, it is preferable that this predetermined threshold be variable. Accordingly, threshold detector 75 is constructed and arranged to have three possible threshold values, depending upon the contrast of the printing being scanned, as indicated by which one of the three contrast indication signals H, M and L applied thereto from contrast detector 80 in FIG. 17 is at a true logical level. More specifically, contrast detector 80 operates in response to the scanning signal $e_s$ at the output of amplifier 22 in FIG. 1, to cause only one of its outputs H, M or L to be at a true logical level, H being true when signal $e_s$ indicates a medium printing contrast, and L being true when $e_s$ indicates a low printing contrast.

From the description so far, it will be understood that the output 75*a* of threshold detector 75 will be true when the number of activated blocks in FIG. 10 causes the summing amplifier output 70*a* to exceed the particular threshold value provided by threshold detector 75 in accordance with the contrast indication signals H, M and L applied thereto. As shown in FIG. 17, threshold detector output 75*a* is applied to the "on" input of flip-flop FF4, via AND gate 96 to which clock pulses C are also applied. Thus, if the threshold of threshold detector 75 is exceeded for at least one clock pulse of a column scan, flip-flop FF4 will be turned "on" to indicate that sufficient continuity was obtained with respect to at least one bit intercepted during that column scan to indicate the presence of a character in the scanning field. Begin signal *b* (FIGS. 1 and 3) is applied to the "off" input of flip-flop FF4 to turn off flip-flop FF4 (if not already off) at the beginning of each column scan in preparation for detecting whether the threshold provided by threshold detector 75 is exceeded during that column scan.

At this point in the description it will be helpful to consider the timing graphs of FIG. 3 in more detail, which illustrate the timing relationships of various pertinent signals during three exemplary column scans designated column scan A, column scan B, and column scan C occurring during the scanning of a character in the character detection and registration operation. FIG. 2 illustrates the relative location of column scans A, B and C during the scanning of a character. For the purpose of the exemplary column scans of FIGS. 2 and 3, it will be assumed that the printing is of high contrast for which condition no breaks in character continuity are permitted to occur. The manner in which medium and low contrast printing conditions are handled for which character continuity breaks are permitted will be considered later on herein.

Column scan A will be considered first, and represents the first column scan immediately following the application of a start signal S to character detection and registration circuitry 45 in FIG. 1. It will be understood that such a start signal S is typically provided by recognition circuitry 50 following its completion of recognition operations on a character. Start signal S serves to initiate the operation of the character detection and registration circuitry 45 to detect and register the next character for recognition by recognition circuitry 50. It will be noted in FIGS. 3 and 17 that start signal S is used to turn "on" flip-flop FF9, whereby to cause output $FF_9$ thereof to become true to enable AND gate 36 in FIG. 4 and thereby permit input data bits to be fed into matrix 35 in the manner previously described in connection with FIGS. 5—9.

It will be understood from FIG. 2 that column scan A takes place prior to interception of a character and, thus, little or no black is intercepted, as indicated by signal E in FIG. 3 being true for only relatively short periods, as might occur, for example, because of noise. Accordingly, during column scan A, the summing amplifier output 70*a* in FIG. 17 will not exceed the threshold of threshold detector 75, and flip-flop FF4 will remain "off," as indicated in FIG. 3 by the false state of true output $FF_4$.

The time period indicated by numeral 83 in FIG. 3 corresponds to column scans following column scan A and which, like column scan A, have not yet intercepted a sufficient portion of the next character to provide the required continuity, causing flip-flop FF4 to remain "off." Column scan B in FIGS. 2 and 3 corresponds to the first column scan for which flip-flop FF4 in FIG. 17 turns "on" (as indicated in FIG. 3 by $FF_4$ becoming true during column scan B), which occurs as a result of a sufficient portion of a character having been intercepted to cause output 70*a* of summing amplifier 70 to exceed the threshold of threshold detector 75 for at least one of the 40 clock pulses occurring during column scan B. With reference to FIG. 17 and the graphs for $A_o$, $FF_4$, $FF_3$ and $FF_9$ in FIG. 3, it will be understood that flip-flop FF3 is turned "on" by pulse $A_o$ at the end of column scan B, via AND gate 94, which is enabled as a result of flip-flop FF9 having been turned "on" by start signal S, and flip-flop FF4 having been turned "on" during column scan B. The time period indicated by the numeral 93 in FIG. 3 corresponds to column scans following column scan B for which, like column scan B, flip-flop FF4 is turned "on" during the scan as a result of a sufficient continuity having been detected. Flip-flop FF4 is turned "off" at the beginning of each column scan by begin signal *b* in preparation for the detection of continuity for each column scan.

Figure 18:
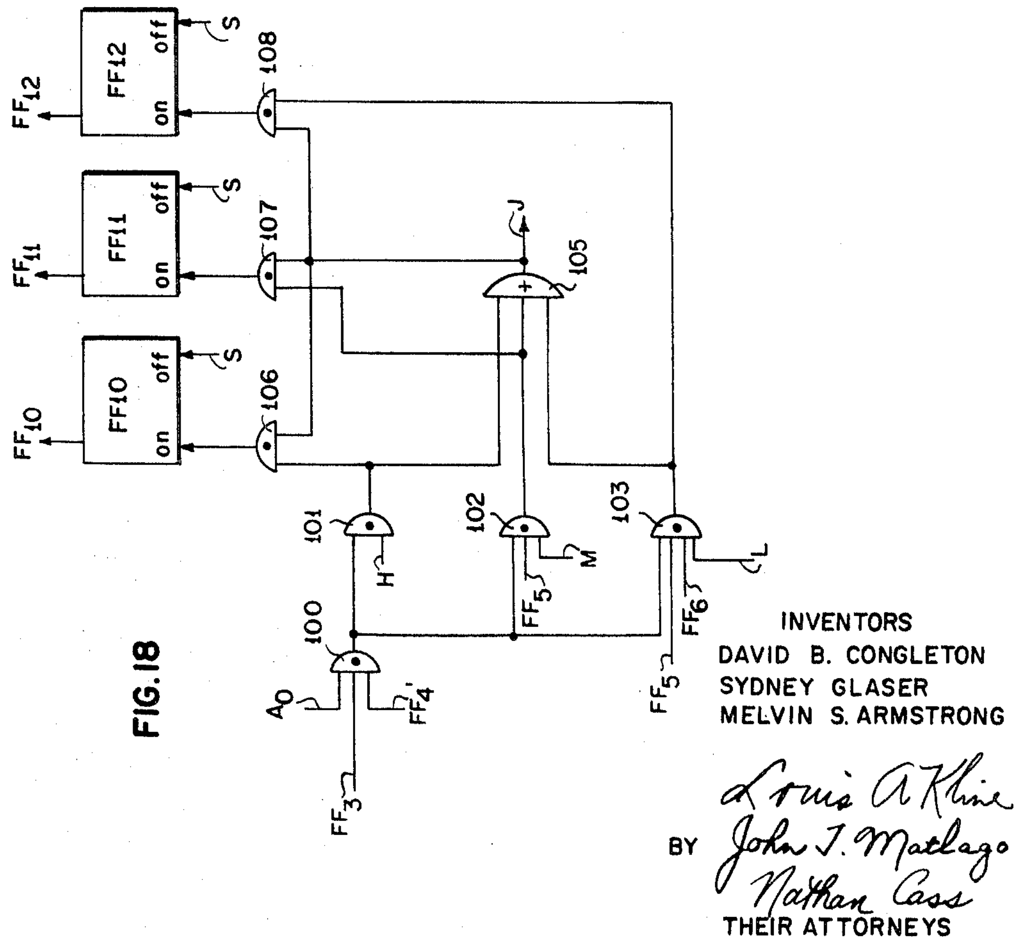

Column scan C in FIGS. 2 and 3 corresponds to the first column scan following column scan B for which flip-flop FF4 in FIG. 17 is not turned "on." For the assumed condition of high contrast printing, this occurrence is used to generate the signal J in FIG. 3 indicating the end of character detection and registration operations. FIG. 18 illustrates typical circuitry provided in character detection and registration circuitry 45 for generating this end of character signal J. For the condition of high contrast printing presently being assumed, it will only be necessary at this time to consider AND gates 100, 101 and 106, OR gate 105 and flip-flop FF10 in FIG. 18; the other circuitry of FIG. 18 will be considered later on herein when the manner of handling medium and low contrast conditions is described. Thus, with reference to AND gate 100 in FIG. 18, it will be understood with additional reference to FIG. 3 that, assuming no breaks in character continuity, the output of AND gate 100 will become true during pulse $A_o$ of column scan C. This will become evident by noting that outputs $FF_3$ and $FF_4'$ from respective flip-flop FF3 and FF4 will both be true during pulse $A_o$ only for column scan C, $FF_3$ being false prior to the occurrence of $A_o$ in column scan B, and $FF_4'$ being false during the occurrence of signal $A_o$ of column scan B and during the occurrence of signal $A_o$ of every column scan prior to column scan C.

The appearance of a true signal at the output of AND gate 100 in FIG. 18 during $A_o$ of column scan C passes, via AND gate 100 (which is enabled by high contrast indication signal H from contrast detector 80 in FIG. 17) and OR gate 105 in FIG. 18, to produce the end of character signal J which signals the completion of character detection and registration operations. The output of AND gate 101 is also fed to the "on" input of flip-flop FF10 (which is turned "off" at the start of character detection and registration operations by start signal S) along with signal J to turn flip-flop FF10 "on" (FIG. 3) to indicate to recognition circuitry 50 (FIG. 1) that the end of character signal J occurred during a high contrast printing condition, as is being assumed for this description. As will be explained hereinafter, if the end of character signal J occurred during a medium contrast condition, only flip-flop FF11 would be turned "on," and if J occurred during a low contrast condition, only flip-flop FF12 would be turned "on."

The end of character signal J is also used to turn "off" flip-flops FF3 and FF9 in FIG. 17, which will then remain "off" until detection and registration operations are resumed for the next character. The turning "off" of flip-flop FF9 in FIG. 17 by end of character signal J will cause output $FF_9$ applied to AND gate 36 at the input to matrix 35 in FIG. 4 to become false to, in effect, "freeze" matrix 35 at the state it is in at the end of column scan C, which may typically be as illustrated in FIG. 9. Recognition circuitry 50 in FIG. 1 then operates to perform its recognition operations with respect to the character frozen in the matrix.

So far, operation has only been considered for a high contrast printing condition for which it is assumed that there are no continuity breaks in a character. This is a good assumption, since the higher the contrast the more unlikely that a break in character continuity would occur, and permits discrimination against the higher probability of noise occurring at higher contrasts. For medium and low contrast printing, a break in character continuity is more likely, but this will not reduce the noise discrimination capability, since the probability of noise reduces as the contrast decreases. If no provision is made for handling such contrast variations, an end of character signal J would be prematurely produced in the event of a character break, and recognition circuitry 50 in FIG. 1 would no doubt reject the character. To reduce the number of such rejects, character detection and registration circuitry 45 in FIG. 1 is constructed and arranged to automatically permit the handling of varying contrasts, as will now be described.

The basic approach to providing for the automatic handling of character breaks for medium and low contrast printing is by permitting a maximum of a one column break in a character in matrix 35 for medium contrast printing, and a maximum of a two column break for low contrast printing. The character detection and recognition circuitry 45 is caused to compensate for such permissible breaks by providing for the substitution thereof in appropriate blocks of FIG. 10 using AND gates G, G2 and G3 operating in response to outputs $FF_5$, $FF_6$ and $FF_7$ of respective flip-flops FF5, FF6 and FF7 illustrated in FIG. 19.

Figure 19:
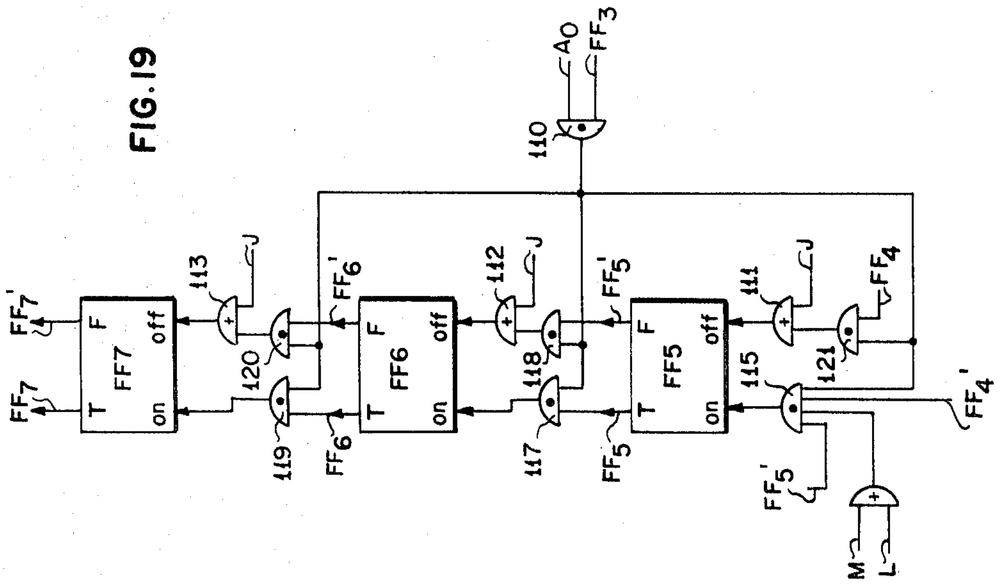

More specifically, it will be understood from FIG. 19 that, at the beginning of detection and registration operations, flip-flops FF5, FF6 and FF7 will each be "off" as a result of the end of character signal J generated for the previous character having been applied to the "off" inputs thereof via respective OR gates 111—113. AND gate 110 in FIG. 19 then prevents operation of flip-flops FF5, FF6 and FF7 during the next following character detection and registration operations until flip-flop FF3 in FIG. 17 is turned on during the first column scan for which sufficient continuity is obtained, as illustrated, for example, by the column B scan in FIG. 3.

It will be apparent from FIG. 19 that flip-flops FF6 and FF7 operate as a shift register with respect to flip-flop FF5; that is, in response to each $A_0$ signal of a column scan following the turning "on" of flip-flop FF3 in FIG. 17, AND gates 117—120 cooperate with the respective true and false outputs $FF_5$, $FF_5'$, $FF_6$ and $FF_6'$ applied thereto to cause the state of flip-flop FF5 to be shifted into flip-flop FF6 and the state of flip-flop FF6 to be shifted into flip-flop FF7. This shifting will, of course, have no significance unless or until flip-flop FF5 is turned "on" during a column scan. However, flip-flop FF5 cannot be turned "on" until after column scan B in FIG. 3 when flip-flop FF3 in FIG. 17 is turned "on" to enable AND gate 110 in FIG. 18, and then only if a medium or low contrast condition exists so that AND gate 115 is enabled by the true state of either signal M or L applied thereto via OR gate 121. If, on the other hand, H is true, indicating a high contrast condition, the circuit of FIG. 19 will remain inoperative, and gates G1, G2, and G3 will have no effect on the operation of the blocks of FIG. 10.

It will, thus, be understood from FIG. 19 that, when a medium or low contrast condition exists, flip-flop FF5 will be turned "on" by signal $A_0$, acting via AND gates 110 and 115, during the first column scan following column scan B in FIG. 3 for which $FF_4'$ becomes true as a result of flip-flop FF4 in FIG. 17 remaining "off" because of a lack of continuity occurring during the column scan. Such a scan will be the same as column scan C in FIG. 3, except that, as will shortly be explained, no end of character signal J will be produced and all of flip-flops FF10, FF11 and FF12 will remain "off."

As a result of flip-flop FF5 turning "on,", output signal $FF_5'$ applied to contrast detector 80 in FIG. 17 will become false, in response to which, threshold detector 80 will "freeze" its outputs H, M and L at their present states, regardless of $e_s$, until flip-flop FF5 in FIG. 19 turns "off" to cause $FF_5'$ to again be true. It will be understood that threshold detector 80 is suitably provided with a sufficiently long operating time constant so that, when its output states are "frozen" in response to $FF_5'$ false, they will reflect the average contrast obtained over several previous column scans occurring prior to the column scan for which flip-flop FF5 in FIG. 19 is turned "on."

The turning "on" of flip-flop FF5 in FIG. 19 during a column scan, as described above, also causes output $FF_5$ to enable AND gate G1 in FIG. 10 whose output $G_1$ is applied to blocks 19–2 and 21–2 in column 2 in the manner illustrated for $G_2$ in FIG. 15. As a result, during the next column scan following the column scan for which flip-flop FF5 is turned "on," output $G_1$ from AND gate G1 in FIG. 10 will cause each of blocks 19–2 and 21–2 to act as if its respective matrix flip-flop were "on" for each clock pulse for which a black bit is in the key position 20–1, regardless of whether its respective flip-flop matrix is, in fact, "on" at these positions.

The reason why the substitution of output $G_1$ for the respective matrix flip-flops of blocks 19–2 and 21–2 compensates for a break in continuity will be understood by noting that the bits obtained during the column scan for which a lack of continuity was obtained will be in column 2 of the matrix during the next column scan; also, because of this lack of continuity, none or only a relatively small number of these column 2 matrix flip-flops will be "on," so that a lack of continuity may also be obtained for this next column scan. However, by permitting output signal $G_1$ from AND gate G1 to provide for the activation of blocks 19–2 and 21–2 whenever the key block 20–1 is activated, regardless of whether their respective matrix flip-flops are "on," sufficient propagation through column 2 is provided to prevent the lack of "on" column 2 matrix flip-flops from causing a lack of continuity to be obtained during this next column scan, if such would not otherwise occur because of the states of matrix flip-flops in other columns.

It will be understood that during column scans following that considered above, the column scan bits which produced the lack of continuity will progress one column for each column scan. Since the "on" state of flip-flop FF5 is shifted to flip-flop FF6 and then to flip-flop FF7 in response to signal $A_0$ at the end of each column scan, compensation for this one column continuity break is also provided as it reaches columns 3 and 4 using respective flip-flops FF6 and FF7 and their respective AND gates G2 and G3 in the same manner as described for column 2 using flip-flop FF5 and AND gate G1, with the difference that the outputs of respective AND gates G2 and G3 in FIG. 10 are applied to an appropriately greater number of blocks in order to simulate the progressive activation of blocks as propagation progresses to higher and higher columns. Although compensation beyond column 4 could also be provided, such is not done, since it may normally be assumed that the column scan bits which produced the lack of continuity will have a negligible effect on continuity detection once they pass column 4.

So far, FIG. 19 has been considered to the extent of explaining how, if a medium or low contrast condition exists, flip-flops FF5, FF6, and FF7 cooperate with respective AND gates G1, G2 and G3 feeding respective blocks in FIG. 10 to provide compensation for a lack of continuity occurring in a single column as the column scan bits which caused the lack of continuity progress through columns 2, 3 and 4 of the matrix, after which their effect may be considered negligible. Considering now the column scan following the one which first caused a lack of continuity, if it produces a successful indication of continuity, flip-flop FF4 in FIG. 17 will be turned "on" to make $FF_4$ true to enable AND gate 121 in FIG. 19. As a result, in response to the occurrence of $A_0$ at the end of this column scan, flip-flop FF5 will be turned "off," since the successful continuity obtained will obviate the need for compensation for that column. Of course, if a lack of continuity should again occur on the next following or some other column scan, the above described compensation operations will be repeated.

As mentioned previously, for a medium contrast printing condition, it is assumed that a maximum of a one-column break in continuity can occur (that is, a lack of continuity being produced for one-column scan), while for a low contrast printing condition, it is assumed that a maximum of a two-column break in continuity can occur (that is, a lack of continuity being produced for two consecutive column scans). Accordingly, if a medium contrast condition exists, the occurrence of a lack of continuity for two consecutive column scans is used to indicate the completion of scanning of a character and, if a low contrast condition exists, the occurrence of a lack of continuity for three consecutive column scans is used to indicate the completion of scanning of a character. The circuit of FIG. 18 acting in cooperation with the circuit of FIG. 19 provides for such operation. This is accomplished using AND gates 102 and 103 in FIG. 18, to which signals M and L are respectively applied, to determine when to generate the end of character signal J, the generation of which terminates operations of the circuit of FIG. 19 as a result of its application to the "off" inputs of flip-flops FF5, FF6 and FF7 via AND gates 111 to 113.

Considering FIG. 18 in more detail, it will be remembered from a previous discussion herein that, for a high contrast condition (when H is true), an end of character signal J is generated, via AND gates 100 and 101 and OR gate 105, in response to the first column scan following column scan B in FIG. 3 for which a lack of continuity is obtained, such as illustrated by column scan C in FIG. 3.

For a medium contrast condition (when M is true), the end of character signal J is generated via AND gates 100 and 102 and OR gate 105 in FIG. 19. It will be understood that, because AND gate 102 cannot become true until flip-flop FF5 is turned "on" to make $FF_6$ true, it is only after the second consecutive column scan for which a lack of continuity is obtained that the end of character signal J will be generated. It will likewise be understood that, for a low contrast condition (when L is true), the end of character signal J is generated via AND gates 100 and 103 and OR gate 105 in FIG. 19 and, since AND gate 103 cannot become true until both of signals $FF_5$ and $FF_6$ are true, the end of character signal J will be generated only after the third consecutive column scan for which a lack of continuity is obtained.

It is further to be noted in FIG. 18, as pointed out previously, that AND gates 101 AND 103 also serve to enable respective AND gates 106 and 108 applied to the "on" inputs of respective flip-flops to FF12. Consequently, when the end of character signal J is generated, a respective one of flip-flops FF10 to FF12 will be turned "on" to indicate the contrast condition existing at the time the end of character signal J is generated.

It will be remembered from the previous discussion herein that the occurrence of the end of character signal J turns "off" flip-flop FF9 in FIG. 17 to "freeze" the character in matrix 35 by disabling AND gate 36 in FIG. 4. Also, signal J is applied to recognition circuitry 50 in FIG. 1 to initiate the recognition operations thereof on the character frozen in the matrix, the matrix flip-flop outputs being applied thereto via lines 35*a*. In order to facilitate the recognition operations of recognition circuitry 50, character detection and registration circuitry 45 provides appropriate horizontal and vertical registration data thereto indicating the relative position of the character frozen in the matrix. Horizontal data is provided by the outputs $FF_{10}$, $FF_{11}$, and $FF_{12}$ of respective flip-flops FF10, FF11, and FF12 of FIG. 18, the leftmost edge of the character being in column 2 of the matrix for $FF_{10}$ true, in column 3 for $FF_{11}$ true, and in column 4 for $FF_{12}$ true. This will be understood by noting that the particular one of flip-flops FF10, FF11 and FF12 which is "on" will indicate whether signal J occurred during a high, low, or medium contrast condition which, in turn, indicates how many consecutive column scans which failed to produce continuity had to occur before signal J was generated, thereby indicating in which column the leftmost edge of the character resides when signal J occurs to freeze the character in the matrix.

Figure 20:
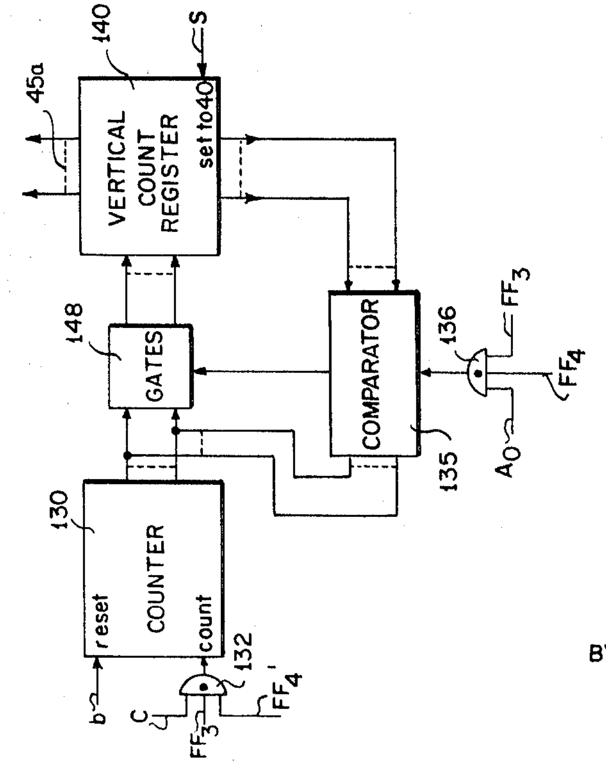

Registration data as to the vertical position of the character frozen in the matrix is provided by character detection and registration circuitry 45 to recognition circuitry 50 in FIG. 1, via lines 45*a*, using a circuit such as illustrated in FIG. 20, A counter 130 in FIG. 20 is reset to zero at the beginning of each column scan by begin signal *b* and, starting with column scans following column scan B in FIG. 3 (during which $FF_3$ becomes true to enable AND gate 132), counter 130 is caused to count the clock pulses occurring during each such column scan until flip-flop FF4 in FIG. 17 is turned "on" during the column scan to make $FF_4'$ false as a result of continuity being obtained. It will thus be understood, with additional reference to FIG. 2, that the count which counter 130 of FIG. 20 reaches during a column scan will be an indication of the distance of the topmost edge of the character intercepted during that column scan to the top of the matrix, the lower the count of counter 130, the closer the top of the intercepted character edge is to the top of the matrix.

The output of counter 130 in FIG. 20 is applied to a comparator 135. AND gate 136 causes comparator 130 to operate, in response to signal $A_o$ occurring during each column scan following column scan B (FIG. 3) for which continuity is obtained, to compare the count of counter 130 with the count in a vertical count register 140, which is set to an initial count 40 by start signal S (FIG. 3). If comparator 135 finds that the count of counter 130 is less than the count contained in vertical count register 140, then it acts to open AND gates 148 to cause the count of counter 130 to be set up in vertical count register 140. It will thus be understood that the count contained in vertical count register 140 when signal J occurs, which count is indicated by output lines 45*a*, will be the smallest count to which counter 130 was advanced during a column scan which intercepted the character. The count indicated by output lines 45*a* at the occurrence of signal J will thus be a measure of the distance between the topmost edge of the character and the top of the matrix, thereby providing the desired vertical registration data to recognition circuitry 50 in FIG. 1.

In response to the horizontal and vertical registration data applied thereto from character detection and registration circuitry 45, recognition circuitry 50 may operate to shift the character frozen in the matrix to a particular reference position which will be the same for all characters. This may be accomplished via lines 50*a* in FIG. 1 connected to the matrix flip-flops to provide up, down, left or right shifting or data therein to shift the character to this reference position. For the sake of clarity, such connections are not illustrated in FIG. 4, but may be provided as disclosed in connection with FIG. 13 of the aforementioned U.S. Pat. No. 3,213,423.

While the foregoing disclosure has been concerned primarily with a particular illustrative embodiment, it will be appreciated that the invention is susceptible of various modifications in both construction and arrangement, and may be employed for various uses other than that disclosed herein. The present invention, therefore, is to be considered as including all modifications and variations falling within the scope of the invention as defined in the appended claims.

We claim:

1. In a character recognition system, a record medium having characters provided on a contrasting background, scanning means for scanning said medium, first means responsive to said scanning means for providing a measure of the continuity of contrasting areas on said background, and second means responsive to the measure of continuity provided by said first means for detecting the presence of a character.

2. The invention in accordance with claim 1, wherein said second means additionally includes means for determining the location of at least two edges of a character in response to said measure of continuity.

3. The invention in accordance with claim 1, wherein said scanning means is constructed and arranged to progressively scan said medium, and wherein said first means provides said measure of continuity based on the continuity of each contrasting area with previously scanned contrasting areas.

4. The invention in accordance with claim 1 wherein said second means includes means for detecting when said continuity exceeds a threshold value.

5. The invention in accordance with claim 3, wherein said threshold value is variable in response to the degree of contrast between said contrasting areas and said background.

6. The invention in accordance with claim 1, wherein said first means includes conversion means for converting the scanning output of said scanning means into predetermined groups of individual signals, each individual signal having a value representative of the contrast of a corresponding area of said medium, and wherein said second means includes means for detecting the presence of a character based on a predetermined minimum measure of continuity being obtained for at least one of the individual signals in a predetermined group.

7. The invention in accordance with claim 6, wherein said scanning means and said first means are constructed and arranged so that said groups of individual signals correspond to spaced parallel scans of said medium, and wherein said second means is constructed and arranged to detect one edge of a character in response to the initial occurrence of a predetermined minimum measure of continuity being obtained for at least one of the individual signals in a group and detects the other edge of a character based on a lack of a predetermined minimum measure of continuity being obtained for a predetermined number of groups after the presence of a character is detected.

8. The invention in accordance with claim 6, wherein said second means also includes means for varying said predetermined number of groups in accordance with the degree of contrast of the character being scanned with respect to said background.

9. In a character recognition system, a record medium having a background on which contrasting characters are provided, scanning means for progressively scanning said medium, detection and registration means for detecting the presence of a character and for providing registration data relative thereto, and recognition means responsive to said detection and registration means for identifying a character, said detection and registration means including means responsive to said scanning means for detecting the presence of a character in response to the continuity of portions thereof.

10. The invention in accordance with claim 9, wherein said detection and registration means additionally includes means for providing registration data based on the detection of the beginning and end of a character as determined by continuity measurements thereon.

11. The invention in accordance with claim 9, wherein said detection and registration means includes a matrix of two-state elements, means for entering data into said matrix in response to said scanning means, and logical circuit means coupled to predetermined ones of said elements for determining continuity based on the pattern of data therein.

12. In a character recognition system, a record medium having characters provided on a contrasting background, scanning means for scanning said medium, means responsive to said scanning means for producing individual signals having values respectively corresponding to the relative contrast of areas traversed during scanning, a matrix of conditionable elements, means for entering said individual signals into said matrix so that the condition of the elements therein correspond to the relative contrast of areas scanned by said scanning means with respect to said background, and means responsive to predetermined ones of said elements for obtaining a measure of the continuity of those areas scanned which contrast with said background.

13. In a character recognition system, a record medium having characters provided on a contrasting background, scanning means for progressively scanning said medium, first means responsive to said scanning means for producing individual two-valued signals respectively corresponding to the relative contrast of areas traversed during scanning, each individual signal having one value when its corresponding area is above a minimum contrast and the other value otherwise, a matrix of two-state elements, second means for entering said individual signals into said matrix so that the states of the elements therein correspond to the areas scanned by said scanning means, third means responsive to a predetermined plurality of said elements for obtaining a measure of continuity based on the continuity of those elements of said predetermined plurality which are in said one state, and fourth means for detecting the presence of a character in response to the measure of continuity provided by said third means.

14. The invention in accordance with claim 13, wherein said second means and said matrix are constructed and arranged so that said individual signals serially enter said matrix and propagate therethrough as said medium is scanned, wherein said third means provides a measure of continuity for each individual signal entered into said matrix, and wherein said fourth means detects the presence of a character in response to the obtaining of a minimum continuity for at least one of a predetermined consecutive group of individual signals entered into said matrix.

15. The invention in accordance with claim 14, wherein said fourth means includes means for varying said minimum continuity in response to the degree of contrast of areas scanned with respect to said background.

16. The invention in accordance with claim 13, wherein said scanning means scans said medium with a plurality of parallel scans, wherein said individual two-valued signals are in groups such that each group corresponds to respective area traversed during a parallel scan, wherein said second means and said matrix are constructed and arranged so that said individual signals serially enter said matrix and propagate therethrough as said medium is scanned, wherein said third means includes a plurality of activatable logical circuits respectively corresponding to said predetermined plurality of said elements, said logical circuits being coupled to said predetermined plurality of elements and to each other so that the number of logical circuits activated is a measure of the continuity of those elements of said predetermined plurality which are in said one state, and wherein said fourth means includes means responsive to said logical circuits for detecting the presence of a character in response to the activation of a predetermined minimum number of said logical blocks.

17. The invention in accordance with claim 16, wherein circuit means in said second means and said matrix enable a character to enter said matrix in a spiral manner.

18. The invention in accordance with claim 16, wherein said fourth means includes further means to detect one edge of a character in response to the initial occurrence of a predetermined minimum measure of continuity being obtained for at least one of the individual signals in a group and to detect the other edge of a character based on a lack of a predetermined minimum measure of continuity being obtained for a predetermined number of groups after the presence of a character is detected.

19. The invention in accordance with claim 16, wherein said parallel scans are substantially perpendicular to the relative direction of movement of a character with respect thereto, and wherein said fourth means also includes means for determining the location of a character with respect to the direction of said parallel scans by determining the earliest occurring individual signal in a group for which a predetermined minimum measure of continuity is obtained.

20. The invention in accordance with claim 16, wherein said fourth means also includes means for varying said predetermined minimum number in response to the degree of contrast of areas scanned with respect to said background.

21. The invention in accordance with claim 16, wherein said third means includes a logical circuit activated in response to its respective element being in said one state and at least one of a predetermined number of adjacent logical circuits being activated.

22. The invention is accordance with claim 21, wherein said third means includes a key logical circuit which is activated whenever its respective element is in said one state, and wherein none of the other logical circuits can be activated unless said key logical circuit is activated.

23. The invention in accordance with claim 22, wherein said third means also includes means coupled to at least one logical circuit other than said key logical circuit capable of substituting for its respective element not being in said one state in response to the detecting of a break in continuity following detection of the presence of a character.

24. The invention in accordance with claim 23, wherein the number of logical circuits in said third means for which substitution is capable of being provided increases as the degree of contrast between said character and said background decreases.

UNITED STATES PATENT OFFICE
CERTIFICATE OF CORRECTION

Patent No. 3,588,818 Dated June 28, 1971

Inventor(s) David B. Congleton et al.

It is certified that error appears in the above-identified patent and that said Letters Patent are hereby corrected as shown below:

Column 2, line 72, after "flip-flops" insert -- FF40-2 to --. Column 5, line 51, "tract" should read -- trast --. Column 6, line 27, "636" should read -- 63b --; line 74, after "contrast, insert -- M being true when $e_s$ indicates a medium printing contrast, --. Column 9, line 12, "G" should read -- G1 --; line 65, before "false" insert -- becoming --. Column 11, line 33, after "flip-flops" insert -- FF10 --; line 51, "18" should read -- 19 --. Column 12, line 33, "or", second occurrence, should read -- of --.

Signed and sealed this 23rd day of May 1972.

(SEAL)
Attest:

EDWARD M. FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334